Jan. 20, 1959        H. E. PEREZ        2,869,581
IGNITION BRAKE LOCK

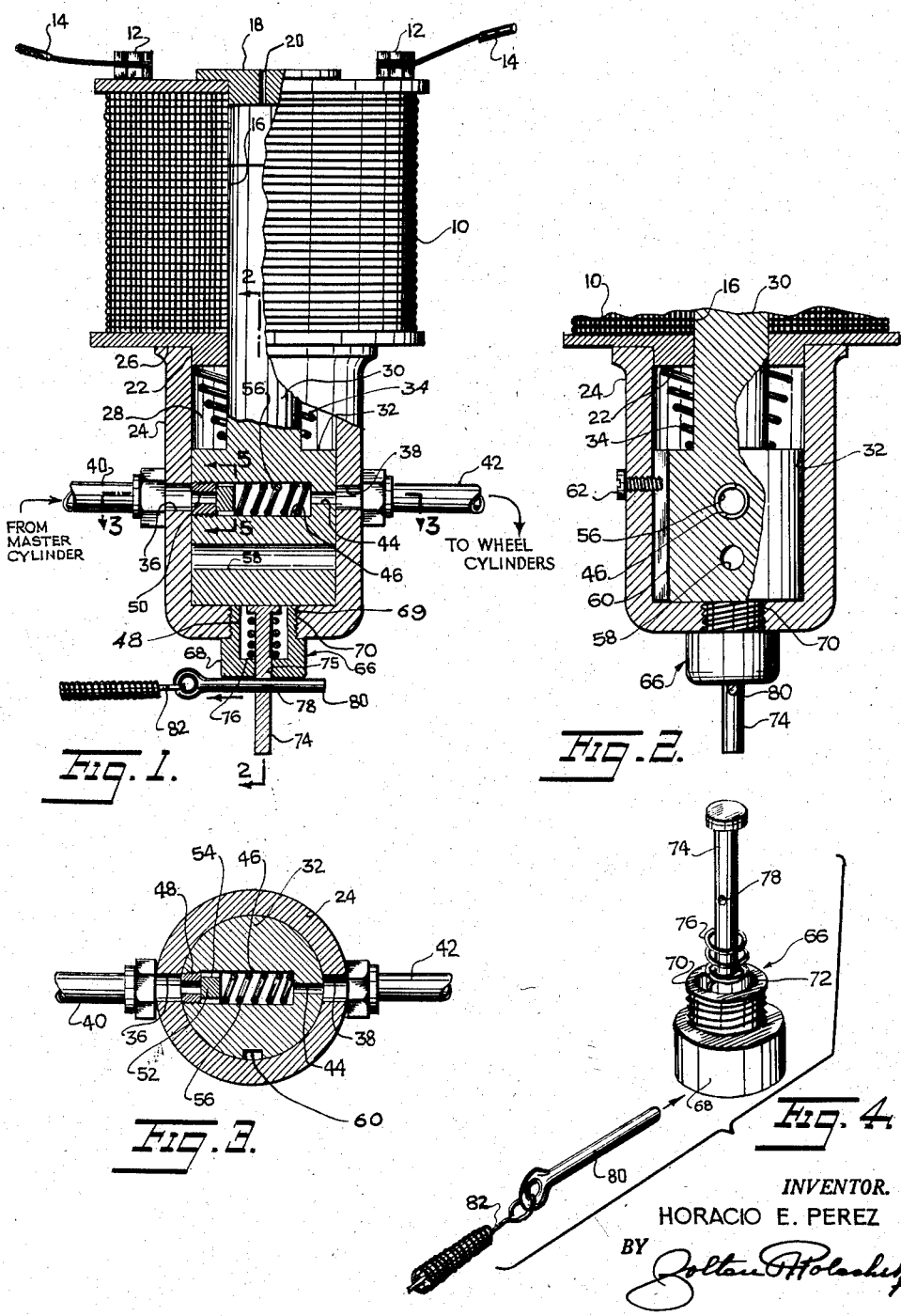

Filed Aug. 30, 1956        2 Sheets—Sheet 2

INVENTOR.
HORACIO E. PEREZ
BY
ATTORNEY

United States Patent Office 2,869,581
Patented Jan. 20, 1959

2,869,581

IGNITION BRAKE LOCK

Horacio E. Perez, Valhalla, N. Y.

Application August 30, 1956, Serial No. 607,152

1 Claim. (Cl. 137—598)

This invention relates to a solenoid valve-actuated device adapted to lock and unlock the brakes of a vehicle responsive to turning the ignition of the vehicle off and on, respectively.

Summarized briefly, the invention includes a solenoid-controlled plunger or core having a spring-loaded valve connected in the hydraulic brake system of a vehicle. In the deenergized condition of the solenoid, the valve permits fluid to be pumped to the wheel cylinders but prevents return of the fluid to the master cylinder. Thus, when the ignition is turned off to deenergize the solenoid, the brakes may be "pumped" to apply the same and will remain in an applied condition. When the ignition is turned on and the solenoid energized, the plunger is attracted to a position such that the brake line is fully open for normal brake operation during the use of the vehicle. Means is encompassed by the invention for deactivating the same if the solenoid cannot be energized due to an exhausted battery or due to a break in the electrical system of the vehicle.

Among important objects of the invention are the following:

First, to provide a device that will cause the hydraulic brakes to be automatically set when the ignition is turned off, to supplement the usual parking brake of the vehicle;

Second, to form the device in a manner that will allow its installation in a vehicle already in use without requirement of doing more than effect a simple connection to the wiring of the vehicle and an equally simple connection to the brake system thereof;

Third, to provide for sure, swift, and automatic operation responsive to turning of the key off or on; and Fourth, to form the device in a manner that will permit its manufacture cheaply while still providing a rugged brake lock that will assure trouble-free operation over a long period of time.

Fifth, to provide a device capable of installation in a vehicle already in use, without requiring modification thereof, the device being designed as an accessory or attachment.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a view of the brake lock partly in elevation and partly in longitudinal section with the solenoid deenergized and the brakes set, in accordance with the invention.

Fig. 2 is a longitudinal section on line 2—2 of Fig. 1.

Fig. 3 is a transverse section on line 3—3 of Fig. 1.

Fig. 4 is an exploded perspective view of the deactivating means per se.

Figure 5:
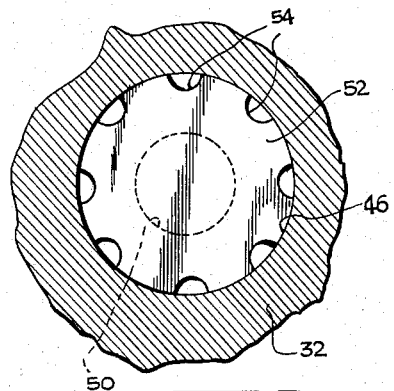
Fig. 5 is a greatly enlarged detail sectional view on line 5—5 of Fig. 1, showing the valve disc.

Referring to the drawings in detail, the device may be mounted anywhere in the vehicle but preferably is located adjacent the line leading from the master cylinder to the several wheel lines, since it is to be connected in the line from the master cylinder.

Figure 6:
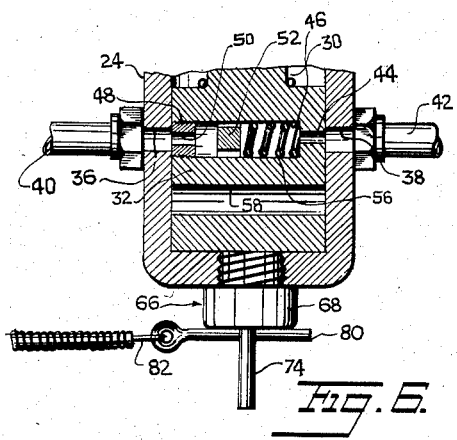
Figs. 6, 7 and 8 are fragmentary longitudinal sectional views on the same cutting plane as Fig. 1, respectively, showing the device in its locked condition with the brakes being pumped, in its unlocked condition, and in its deactivated condition.

The device includes a solenoid with winding 10 having terminals 12 connected to leads 14 and having an axial bore 16. The axial bore 16 of the solenoid is closed at one end by an iron plug 18 having an air vent 20. At its inner end the solenoid has a boss 22 engaged in a cup-shaped housing 24 cemented at 26, or otherwise fixedly secured, to the solenoid in coaxial alignment therewith. The housing has a chamber 28 surrounding a plunger 30 constituting the core of the solenoid and sliding in the bore 16. Within the housing the plunger has a head 32 having wiping contact with the wall of the housing. Held under compression between the head 32 and boss 22 is a spring 34 normally biasing the plunger outwardly of bore 16 when the solenoid is deenergized, to the position of the plunger shown in Figs. 1, 2 and 6.

Formed in the side wall of housing 24 are diametrically opposite ports 36, 38 in communication with lines 40, 42, respectively. Line 40 extends from the master cylinder and line 42 extends to the wheel brake cylinders.

In plunger head 32, a diametrically extending bore 44 is formed with a counterbore 46 threaded at its outer end to receive a plug 48 having a center opening 50. A valve disc 52 (see Fig. 5) has a peripheral series of notches 54 and a solid center closing the opening 50, when the disc is biased against the plug as in Fig. 1 by a compression coil spring 56 interposed between the disc and the inner end of the counterbore.

Paralleling the bore 44 is a constant-diameter bore 58. In the deenergized condition of the solenoid, the bore 44 registers with ports 36, 38. In the energized solenoid condition, bore 58 registers with the ports.

To hold the plunger against rotation during its sliding movement, a keyway 60 extending longitudinally thereof (see Fig. 2) receives a screw 62 carried by housing 24.

Since the keyway 60 extends from end to end of the device, it can constitute an air passage to communicate the opposite ends of the housing, so that one or more air vents may be provided to maintain atmospheric pressure in the housing.

Figure 8:
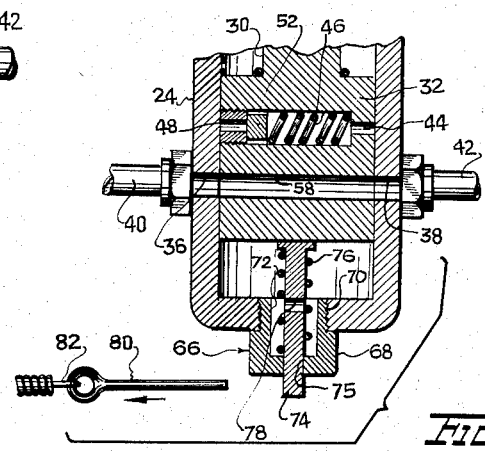

Under some circumstances, as for example when the battery is exhausted or there is a break in the wiring of the vehicle, it may be desired to deactivate the device. To this end, a deactivating means 66 includes a plug 68 having a reduced, threaded, axial extension 70 mounted in a threaded axial opening 69 in the bottom wall of the housing 24. An axial recess 72 of the plug opens inwardly of the housing at the end remote from the solenoid, and a headed stem 74 extends axially within the recess and is slidably mounted in an axial bore 75 of the plug. A compression coil spring 76, seated in the recess and abutting the head of the stem, tends to bias the stem to its Fig. 8 position, so that the plunger is shifted inwardly of the solenoid bore to register bore 58 with ports 36, 38 for normal operation of the brakes, even though the solenoid may be deenergized. Spring 76 is of sufficient strength to overcome the weight of the plunger 30 and the force exerted by spring 34.

For normally maintaining the stem retracted, the stem has a transverse opening 78 receiving a lock pin 80 which may be connected to a steel cable 82 for remote control operation if desired. To deactivate the device, one merely pulls the pin to free stem 74 for movement to its Fig. 8 position. The stem can later be retracted and locked once again.

Figure 9:
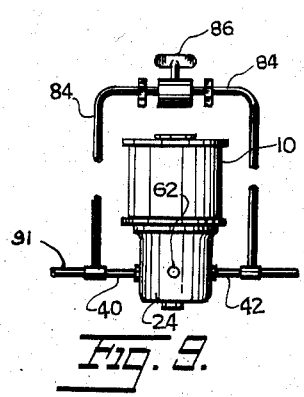
Fig. 9 is a reduced, somewhat diagrammatic view showing a modified deactivating means.
Figure 10:
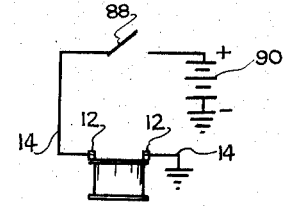
Fig. 10 is a schematic view of the wiring employed in the device.

In a second form (Fig. 9) deactivation is effected through a by-pass 84 connected between lines 40, 42 and normally closed by a valve 86. Opening of the valve permits fluid to flow freely through the by-pass to and from the brakes even though the plunger head is in its brake-locking position of Fig. 1. The device is otherwise like that of Fig. 1, except that an ordinary plug 91 is used to close the threaded bottom opening in the housing when the valve by-pass line is used.

Assuming there is no need for deactivation of the device, its use is as follows:

One terminal 12 has its lead 14 connected to one terminal of the ignition switch 38 of the vehicle. The other switch terminal is connected to one post of battery 90, the other post of which is connected to ground. The other lead 14 of the solenoid is connected to ground.

The wiring arrangement may, of course, be varied. It is important only that the electrical connections be such that when the ignition switch is turned on, the solenoid 10 will be energized, and will remain so until deenergized by turning off of the ignition.

Figure 7:
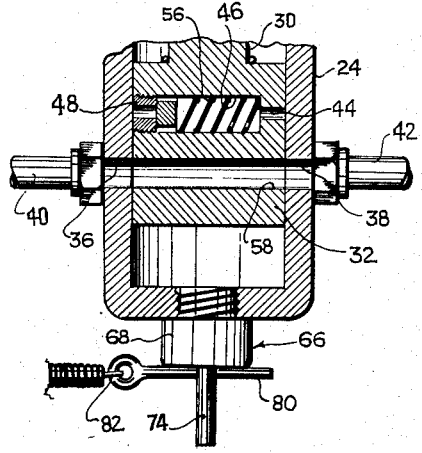

When the switch is on, the plunger is atracted to its Fig. 7 position. Fluid may therefore pass freely through the bore 58 in either direction, permitting normal brake operation while the vehicle is being driven.

When the ignition is turned off, the plunger under the pressure of spring 34, which is now free to expand, is biased axially to its Fig. 1 position. To lock the brakes, one need merely depress the vehicle brake pedal. This causes fluid under pressure to flow from the master cylinder to the wheel cylinders. With bore 44 in registry with ports 36, 38 the fluid shifts valve disc 52 against the restraint of spring 56 away from plug 48, so that the fluid flows from left to right in Fig. 6 through the plug and through the notches 54 to the wheel brakes. On release of the brake pedal, the tendency of the fluid to flow back to the master cylinder and the tendency of spring 56 to expand will immediately seat the valve disc. This causes the brakes to remain set, until such time as the ignition is turned on once again.

As will be apparent, the device automatically sets the brakes, since it is common practice for one to hold the brake depressed when the ignition is turned off. The brakes are released automatically when the ignition is turned on.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

A control valve for hydraulic brake systems comprising a hollow housing having a bottom wall with an opening therein, said housing being open at the top, a solenoid winding mounted on the top of the housing, said solenoid winding having a bore therethrough communicating with the interior of the housing, a plunger slidably mounted in the bore and housing and being attractable to one extreme position upon energization of the solenoid winding and being normally spring-biased to the other extreme position upon deenergization of the solenoid winding, said housing having outlet and inlet ports on opposite sides thereof, said plunger including a head slidable in the housing and having spaced transverse bores, one bore being adapted to register with the outlet and inlet ports in said one extreme position of the plunger, said other bore being adapted to register with the outlet and inlet ports in the other extreme position of the plunger, check valve means in said other bore arranged to permit flow of fluid only in a direction from the inlet port to the outlet port, and means to move the plunger to said one position against said spring biasing even when the solenoid winding is deenergized including a plug in the opening in the bottom wall of the housing, said plug having an axial opening, a stem slidable in said axial opening and shiftable against the head of the plunger to move the plunger to said one extreme position, a removable lock pin normally holding the stem retracted against movement in a direction to move the plunger to said one position, and a spring sleeved around the stem inside the housing tensioned to move the stem in said direction.

References Cited in the file of this patent

UNITED STATES PATENTS

| | | |
|---|---|---|
| 1,027,061 | Norling | May 21, 1912 |
| 1,708,060 | Harrison et al. | Apr. 9, 1929 |
| 2,345,280 | Morgan et al. | Mar. 28, 1944 |
| 2,502,118 | Ashton et al. | Mar. 28, 1950 |
| 2,585,711 | Whitney et al. | Feb. 12, 1952 |
| 2,638,118 | Chandler | May 12, 1953 |